(12) United States Patent
Crean (10) Patent No.: US 6,293,612 B1
(45) Date of Patent: Sep. 25, 2001

(54) RECREATIONAL VEHICLES WITH EXPANDABLE ROOM

(75) Inventor: Johnnie Robert Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

(21) Appl. No.: 09/595,144

(22) Filed: Jun. 16, 2000

(51) Int. Cl.⁷ .................................................. B60P 3/36
(52) U.S. Cl. ........................ 296/175; 52/67; 296/26.13; 296/165; 296/176
(58) Field of Search ......................... 296/24.1, 260.1, 296/26.12, 26.13, 156, 164, 165, 168, 171, 172, 173, 175, 176; 52/67

(56) References Cited

U.S. PATENT DOCUMENTS

| | | | |
|---|---|---|---|
| 1,536,518 | * 5/1925 | Osborn | 52/67 |
| 4,550,946 | * 11/1985 | Hanemaayer | 296/156 |
| 4,589,463 | * 5/1986 | Ryan | 160/88 |
| 5,100,196 | * 3/1992 | Dodgen | 296/156 |
| 5,673,962 | * 10/1997 | Maieli et al. | 296/164 |
| 5,951,082 | * 9/1999 | DiBiago et al. | 296/26.13 |
| 6,089,346 | * 8/2000 | Miller et al. | 52/67 |

FOREIGN PATENT DOCUMENTS

2260951 * 5/1993 (GB) .................................. 296/24.1

* cited by examiner

Primary Examiner—D. Glenn Dayoan
Assistant Examiner—Paul Chenevert
(74) Attorney, Agent, or Firm—Knobbe, Martens, Olson & Bear, LLP (57) ABSTRACT

A recreational vehicle having an expandable room wherein the room can be positioned in a retracted or deployed configuration. In the deployed configuration, the room expands inwardly into the main housing of the vehicle so as to enlarge the area of the room without displacing the fixtures and plumbing that are typically positioned adjacent an outer wall of the room. The room can be extended in conjunction with an exterior slide-out assembly wherein the deployed slide-out assembly creates a larger inner living space so as to accommodate the expanded room.

33 Claims, 10 Drawing Sheets

RECREATIONAL VEHICLES WITH EXPANDABLE ROOM

BACKGROUND OF THE INVENTION

1. Field of the Invention

The present invention relates to recreational vehicles and, in particular, relates to motor homes and travel trailers that are adapted to expand in size so as to increase the effective interior living space of the vehicle.

2. Description of the Related Art

Recreational vehicles are becoming increasingly popular with people who wish to retain the comforts and conveniences of home while spending extended periods of time away at remote locations. In particular, recreational vehicles, such as motor homes, fifth wheel trailers and travel trailers, are modestly priced mobile structures that provide an enclosed interior living space and shelter for individuals who are traveling away from home. In more elaborate configurations, the recreational vehicle typically includes amenities such as a bedroom, a bathroom with a sink and a flushing toilet, a kitchen with a refrigerator, stove, and sink, and a generously sized living area with reclining chairs and an entertainment center. Furthermore, a recreational vehicle can be easily parked at a wide variety of locations so that users can enjoy the amenities of the vehicle at their favorite destination. Consequently, people who use recreational vehicles can usually be assured of a comfortable living environment at their preferred destination without having to rely on the availability of suitable hotels.

In response to consumer demand, manufacturers have developed increasingly larger recreational vehicles. However, state and federal laws limit the dimensions of recreational vehicles that can be transported on public roads, thereby limiting the living space within the vehicle. In particular, current regulations specify a maximum length, otherwise known as the maximum allowed length, of highway bound travel trailers to be no greater than 40 feet. Furthermore, current regulations specify a maximum width, otherwise known as the maximum allowed width, of highway bound travel trailers to be no greater than 8.5 feet. Thus, the recreational vehicle industry has devoted considerable resources to develop improved motor homes, fifth wheel trailers and travel trailers that increase the living space of the vehicle in a manner that is consistent with the forgoing size restrictions.

Consequently, manufacturers have developed recreational vehicles with one or more extendable structures, commonly referred to as slide-outs, that provide the user with a supplemental living space when the vehicle is parked. In particular, the extendable structure is adapted to extend into a deployed configuration during the time that the vehicle is parked so that the living space within the vehicle is increased by an amount which is substantially equal to the supplemental living space of the extendable structure. Furthermore, the extendable structure is adapted to retract into a retracted configuration during the time that the vehicle is being driven or towed so that the traveling dimensions of the recreational vehicle are within the maximum allowed width and length.

The typical extendable structure or slide-out is positioned within an opening of the housing of the recreational vehicle and is comprised of a plurality of walls that form the supplemental living space therein and an opening that provides access to the supplemental living space. In particular, the walls of the typical slide-out are comprised of a lower horizontal wall that forms a single level planar floor which substantially aligns with an adjacent floor of the vehicle housing and an upper horizontal wall that forms a single level planar ceiling which substantially aligns with an adjacent ceiling of the vehicle. Furthermore, the extendable structure or slide-out is comprised of an outer vertical wall that is adapted to align with an outer wall of the motor home or travel trailer while the slide-out is placed in the retracted configuration, and a pair of horizontal side walls that join the upper and lower horizontal walls and the outer vertical wall together.

Such an extendable structure, when in the retracted configuration, is positioned so that the outer vertical wall aligns with the side wall of the recreational vehicle and so that the remaining walls, including the lower horizontal wall, of the extendable structure are positioned within the interior living space of the recreational vehicle. Consequently, in the retracted configuration, the housing of the vehicle forms a more aerodynamic shape having a width and length that are within the maximum allowed width and length for road travel.

In a deployed configuration, the extendable structure extends from the vehicle so that the walls of the extendable structure extend from the opening of the housing of the vehicle so as to align the opening of the extendable structure with the opening of the side wall of the vehicle. Consequently, the floor of the extendable structure extends through the opening of the housing so that the effective living area of the recreational vehicle is increased. Furthermore, the walls of the extendable structure effectively become exterior walls of the recreational vehicle so that the interior living space of the recreational vehicle is enlarged.

In a typical recreational vehicle, the living space is enclosed by the vehicle housing wherein furniture and fixtures are typically placed along the side walls of the housing. Sections of the vehicle housing can be extended from the side walls of the housing using extendable members in a manner as previously described. However, the section of the housing comprising the bathroom is typically not extendable due to the practical considerations associated with movable plumbing fixtures.

However, in some circumstances, increasing the size of the bathroom of a recreational vehicle would be desirable. Generally, bathrooms in recreational vehicles are very small in size as many different living accommodations are positioned within the typical recreational vehicle. For example, the typical recreational vehicle includes a kitchen area, a living area and a bedroom area in addition to the bathroom area. Having all of these areas in a limited space requires that space be saved as much as possible. Since bathrooms are often not expanded through the use of slide-out assemblies, the bathrooms are often made small and compact to save limited space within the recreational vehicle.

However, small, compact bathrooms in recreational vehicles create an impression of the recreational vehicle being less like an ordinary house. In particular, in a small compact bathroom, the user has less space to move about while getting dressed. Moreover, the small compact bathroom, crowded with bathroom fixtures such as toilets, sinks and tubs can created a claustrophobic setting. The people who purchase recreational vehicles, and particularly high end motor homes and fifth wheel trailers, prefer the recreational vehicle to closely approximate the feel of an ordinary house as much as possible. Compact, claustrophobic bathrooms unfortunately inhibit this feel and thus diminish the appeal of recreational vehicles to many purchasers.

Moreover, while bathrooms provide a good example of a particular room within a recreational vehicle that is often cramped and uncomfortable, it will be appreciated that there can be other rooms or spaces within a recreational vehicle that are cramped and not readily expandable. As discussed above, most expansion of the floor space of a recreational vehicle occurs as a result of a slide-out moving outward from the exterior wall of the vehicle. If a room or space within the recreational vehicle is not adjacent a slide-out, the area of the room or space is generally fixed. For example, closets and wardrobes are often cramped and difficult to access as a result of their fixed limited size. When the vehicle is parked, however, it is often desirable for the users of the vehicle to have more room to spread out in.

From the foregoing, therefore, it will be appreciated that there is a need for an improved recreational vehicle that creates a more home-like impression. To this end, there is a need for a recreational vehicle design that has larger rooms and spaces, including those rooms and spaces not located adjacent a slide-out, such as bathrooms, when the recreational vehicle is being used as a living space while still permitting the recreational vehicle to meet the maximum travel size requirements.

SUMMARY OF THE INVENTION

The aforementioned needs are satisfied by the recreational vehicle of the present invention comprising a carriage assembly having a plurality of wheels, and a plurality of outer walls mounted on the carriage assembly wherein the plurality of outer walls define an inner living space having a floor. Furthermore, a plurality of inner walls are mounted within the inner living space, wherein the plurality of inner walls define an inner section. In one preferred embodiment, the inner section comprises a bathroom, however it can be appreciated that the inner section can also comprise other living areas without departing from the scope of the invention. Preferably, the plurality of inner walls are movable between a first configuration, wherein the floor space of the inner section comprises a first area, and a second configuration, wherein the floor space of the inner section comprises a second area greater than the first area.

In one embodiment, the vehicle further comprises a toilet mounted within the inner section comprising the bathroom and a doorway formed in one of the plurality of inner walls wherein the doorway is positioned so as to permit access and use of the toilet when the plurality of inner walls are in both the first configuration and the second configurations. Preferably, the plurality of inner walls comprise a plurality of fixed walls that are attached to each other and are fixedly mounted to the floor of the inner living space and a plurality of movable walls that are attached to each other and are slidably mounted adjacent the floor of the inner living space so that the movable walls can be moved with respect to the plurality of fixed walls between a storage and a deployed configuration.

In another embodiment, the bathroom further comprises a bathtub and a sink and is configured so that all fixtures that require plumbing are placed against a first outer wall of the vehicle housing. As such, all piping interconnecting the bathroom fixtures to the tanks underneath the floor of the bathroom are affixed within the first outer wall of the housing which effectively permits the inner walls of the bathroom to move freely without displacing any bathroom fixtures or piping.

In another embodiment, the vehicle further comprises an exterior slide-out assembly attached to a second outer wall wherein the slide-out assembly can be positioned in a storage configuration and a deployed configuration and wherein the slide-out assembly, in the deployed configuration, increases the area of the living space. Preferably, the exterior slide-out assembly includes a ceiling, a floor, and a plurality of vertical walls mounted at the outer edges of the floor. In particular, the plurality of vertical walls comprise two side walls and an outer wall wherein the side walls join together the floor, the ceiling, and the outer wall of the assembly. Furthermore, the exterior slide-out assembly is movable between a retracted configuration, such that the outer wall of the assembly is positioned to align with the second outer wall of the vehicle housing, and a deployed configuration, wherein the exterior slide-out assembly extends outward from an opening defined by the second outer wall of the housing so as to align an opening formed by the walls of the assembly with the opening defined by the second outer wall of the vehicle. Furthermore, the exterior slide-out assembly is designed to extend outwardly in such a manner so as to provide more space inside the vehicle housing for the movable walls of the bathroom to be deployed into an extended configuration.

In one aspect, the present invention provides a method of deploying and retracting the movable inner walls of the recreational vehicle in tandem with the slide-out assembly. Preferably, the slide-out assembly is connected to the inner walls via a connecting member so that horizontal movement of the slide-out assembly also results in simultaneous horizontal movement of the inner walls. In particular, when the slide-out assembly is being deployed or retracted, the horizontal movement of the slide-out assembly exerts a first force on the connecting member causing the connecting member to exert a second force on the inner walls wherein the second force is sufficient to move the inner walls in the same direction as the slide-out assembly.

In one embodiment, the connecting member is attached to the inner walls in a manner so as to permit the connecting member to move independently of the inner walls for a predetermined distance upon application of the first force before the connecting member begins exerting the second force on the inner walls. As such, in this embodiment, the inner walls begin to move after a predetermined portion of the slide-out assembly has already been deployed or retracted. This feature is particularly suitable for recreational vehicles in which the width of the slide-out assembly is greater than the width of the additional floor space gained by full deployment of the inner walls wherein the difference in width makes simultaneous full deployment of the two sections difficult to achieve. Furthermore, the connecting member can also be attached to the inner walls in a manner so as to permit the connecting member a predetermined amount of vertical movement to accommodate for the limited vertical movement of the slide-out assembly that typically occurs during deployment and retraction. Advantageously, the present movement mechanism of deploying and retracting the movable inner walls in tandem with the slide-out assembly obviates the need of using a separate movement mechanism or manual step to deploy and retract the inner walls.

From the foregoing, it will be appreciated that the recreational vehicle with inner movable walls greatly increases the space within otherwise fixed space rooms within the vehicle when the vehicle is in the stationary, deployed configuration. This greatly improves the livability of the recreational vehicle in that otherwise cramped spaces can be increased in size. This has particular advantages for rooms, like bathrooms, that are generally not expandable through the use of known slide-out assemblies which would otherwise be cramped. These and other objects and advantages of the present invention will become apparent from the fol-

DETAILED DESCRIPTION OF THE PREFERRED EMBODIMENT

Figure 1A:
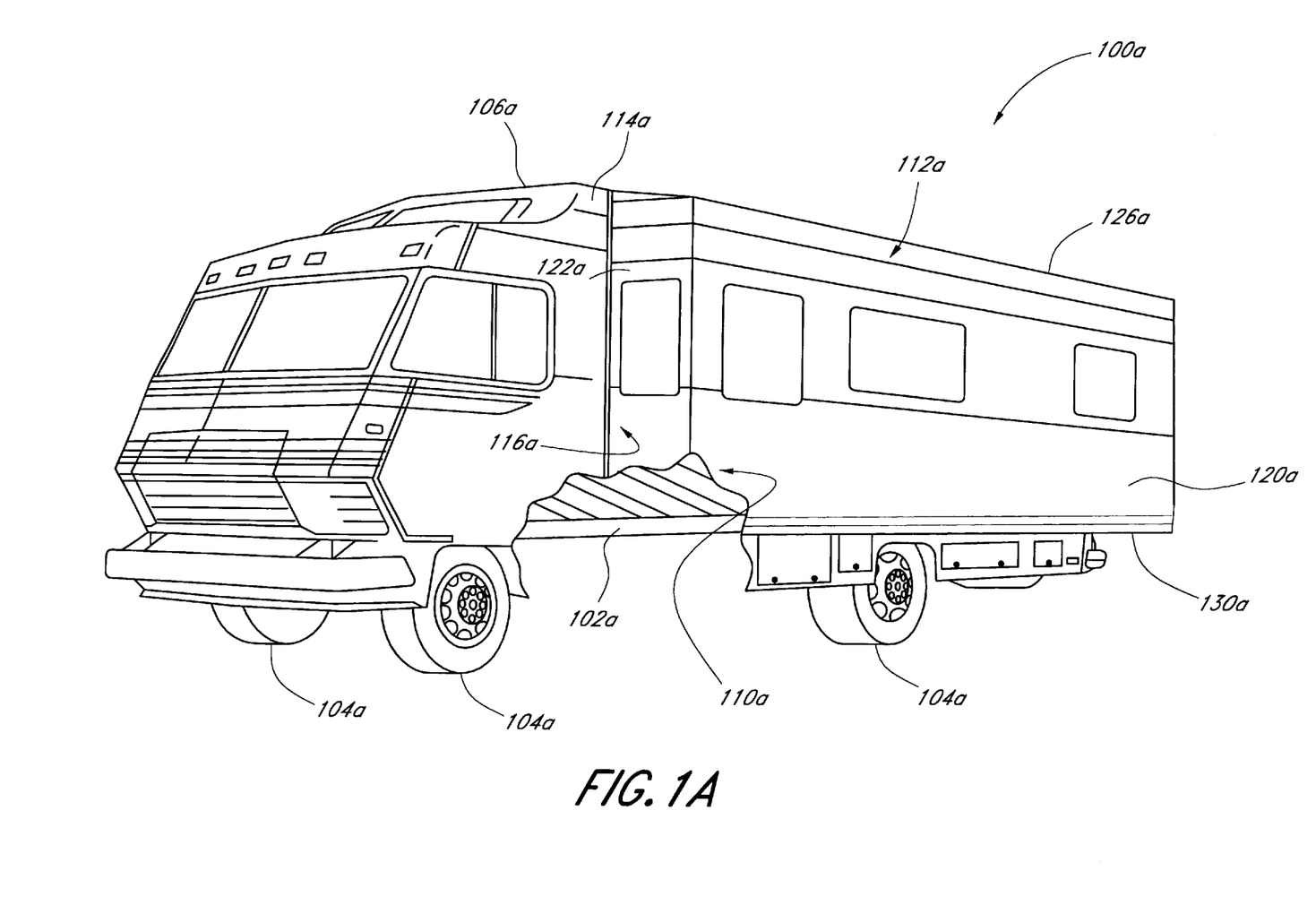
FIG. 1A is a perspective view of a recreational vehicle of the present invention comprising a motor home with an exterior slide-out assembly in a deployed configuration.

References will now be made to the drawings wherein like numerals refer to like parts throughout. FIG. 1A illustrates a preferred embodiment of a recreational vehicle (RV) 100a comprising a motor home having a generally rectangular carriage assembly 102a attached to a plurality of wheels 104a so as to permit rolling movement of the motor home 100a over the ground. As is also shown in FIG. 1A, a main housing 106a is mounted above the carriage assembly 102a and is essentially formed of a plurality of planar walls that are joined together and mounted to the carriage assembly 102a in a well known manner so as to define an inner living space 110a having a floor. Furthermore, an exterior slide-out assembly 112a is shown attached to a first side wall 114a of the main housing 106a and extended from an opening 116a of the main housing 106a in a deployed configuration.

Figure 1B:
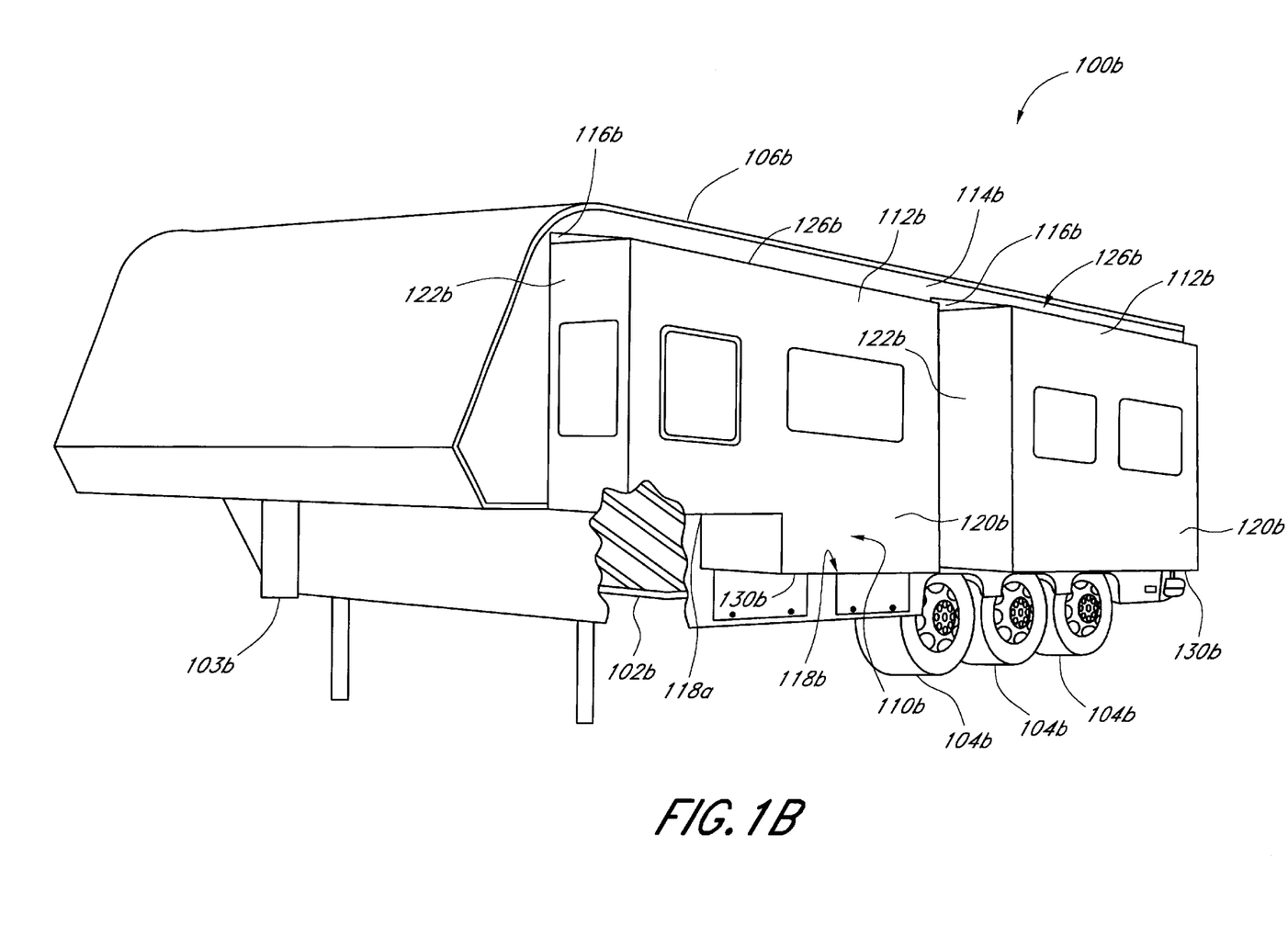
FIG. 1B is a perspective view of a recreational vehicle of the present invention comprising a trailer with an exterior slide-out assembly in a deployed configuration.

FIG. 1B illustrates another embodiment of a recreational vehicle (RV) 100b comprising a fifth wheel trailer having a multiple level, generally rectangular carriage assembly 102b attached to a plurality of wheels 104b so as to permit rolling movement of the trailer 100b over the ground. Furthermore, a male hitch assembly 103b is shown at the front of the trailer 100b and is designed to couple with a known female hitch assembly of a towing vehicle so that the travel trailer 100b can be towed by the towing vehicle. As is also shown in FIG. 1B, a main housing 106b is mounted above the carriage assembly 102b and is essentially formed of a plurality of planar walls that are joined together and mounted to the carriage assembly 102b in a well known manner so as to define an inner living space 110b having multiple level floors. Furthermore, a plurality of exterior slide-out assemblies 112b are shown attached to a first side wall 114b of the main housing 106b and extended from an opening 116b of the main housing 106b in a deployed configuration.

As will be described in greater detail below, the exterior slide-out assembly 112a, 112b, shown respectively in FIGS. 1A and 1B, can either be placed in the deployed configuration so as to effectively increase the inner living space 110a, 110b of the RV 100a, 100b or be placed in a retracted configuration so as to provide the RV 100a, 100b with a more suitable size and shape for being driven or towed on a public road. In particular, the exterior slide-out assembly 112a, 112b is formed of a plurality of walls that join together to form a supplemental living space therein. The plurality of walls include an outer vertical wall 120a, 120b, a front lateral vertical wall 122a, 122b, a rear lateral vertical wall (not shown), an overhead horizontal wall 126a, 126b, and a lower horizontal wall 130a, 130b. In one embodiment, the lower horizontal wall 130b of the trailer 100b further comprises a front lower horizontal wall 118a and a rear lower horizontal wall 118b wherein the front lower horizontal wall 118a defines an upper floor and the rear lower horizontal wall 118b defines a lower floor so as to form a two level extendable housing as described in Applicant's Pending U.S. application Ser. No. 09/283,708 which is hereby incorporated by reference in its entirety.

In a preferred embodiment, the exterior slide-out assembly 112a, 112b is coupled to an actuator assembly that moves the assembly 112a, 112b between the deployed configuration and the retracted configuration in a known manner. Furthermore, although the preferred embodiments of FIGS. 1A and 1B illustrate the exterior slide-out assembly 112a, 112b extending from the left side of the RV 100a, 10b, it can be appreciated that the exterior slide-out assembly 112a, 112b could be adapted to extend from the right side of the RV 100a, 100b in other embodiments. It will be appreciated that the slide-out assemblies 112a, 112b, are typical of slide-out assemblies used on prior art trailers and motor homes and operate in a manner that is known in the art. The purpose of these slide-out assemblies is to increase the living space of the recreational vehicle when the recreational vehicle is parked but still allow for a compact configuration of the vehicle during movement of the vehicle.

Figure 2A:
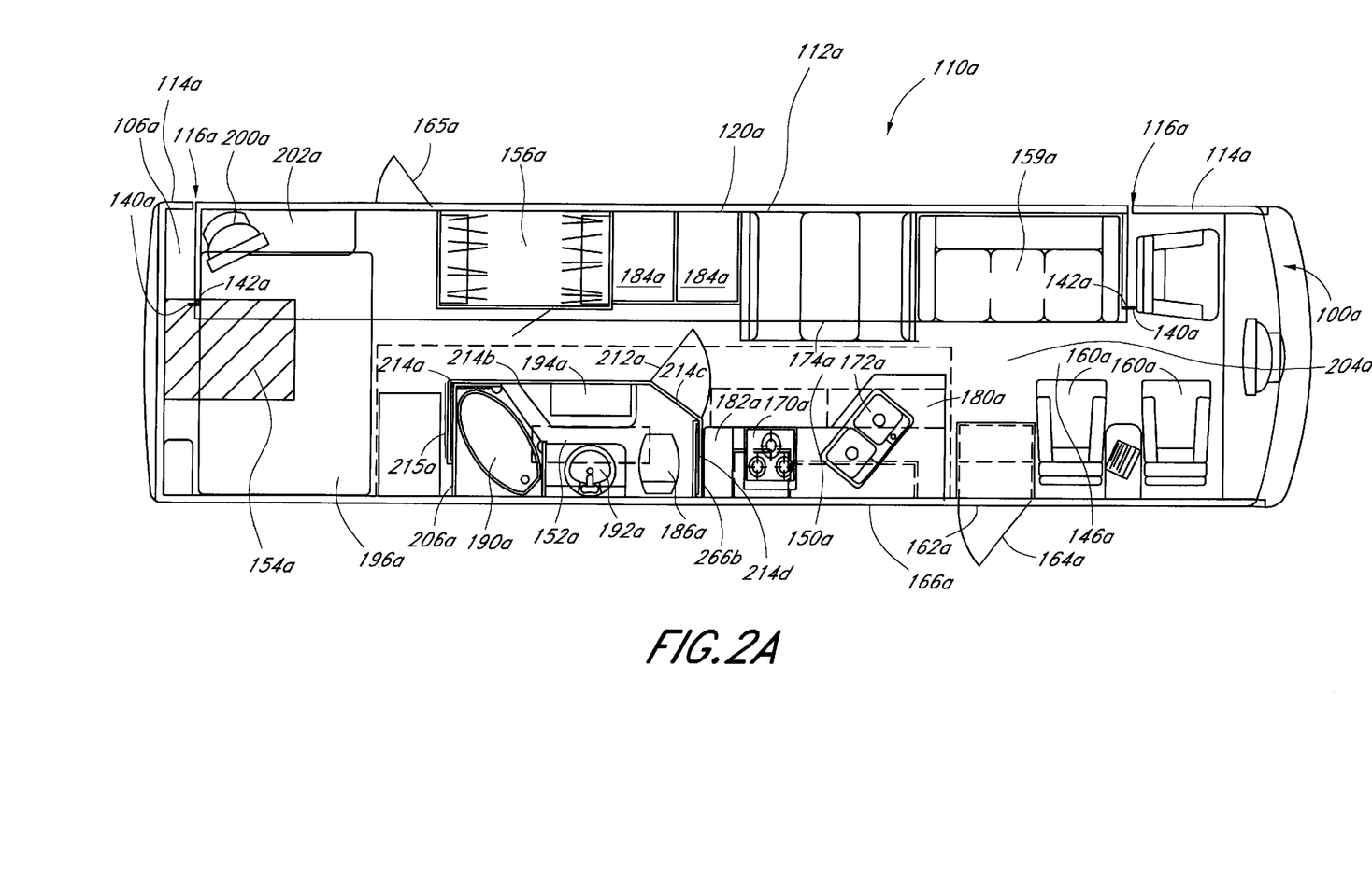
FIG. 2A is an overhead plan view of the motor home of FIG. 1A showing the exterior slide-out assembly and the expandable bathroom in a retracted position.
Figure 2B:
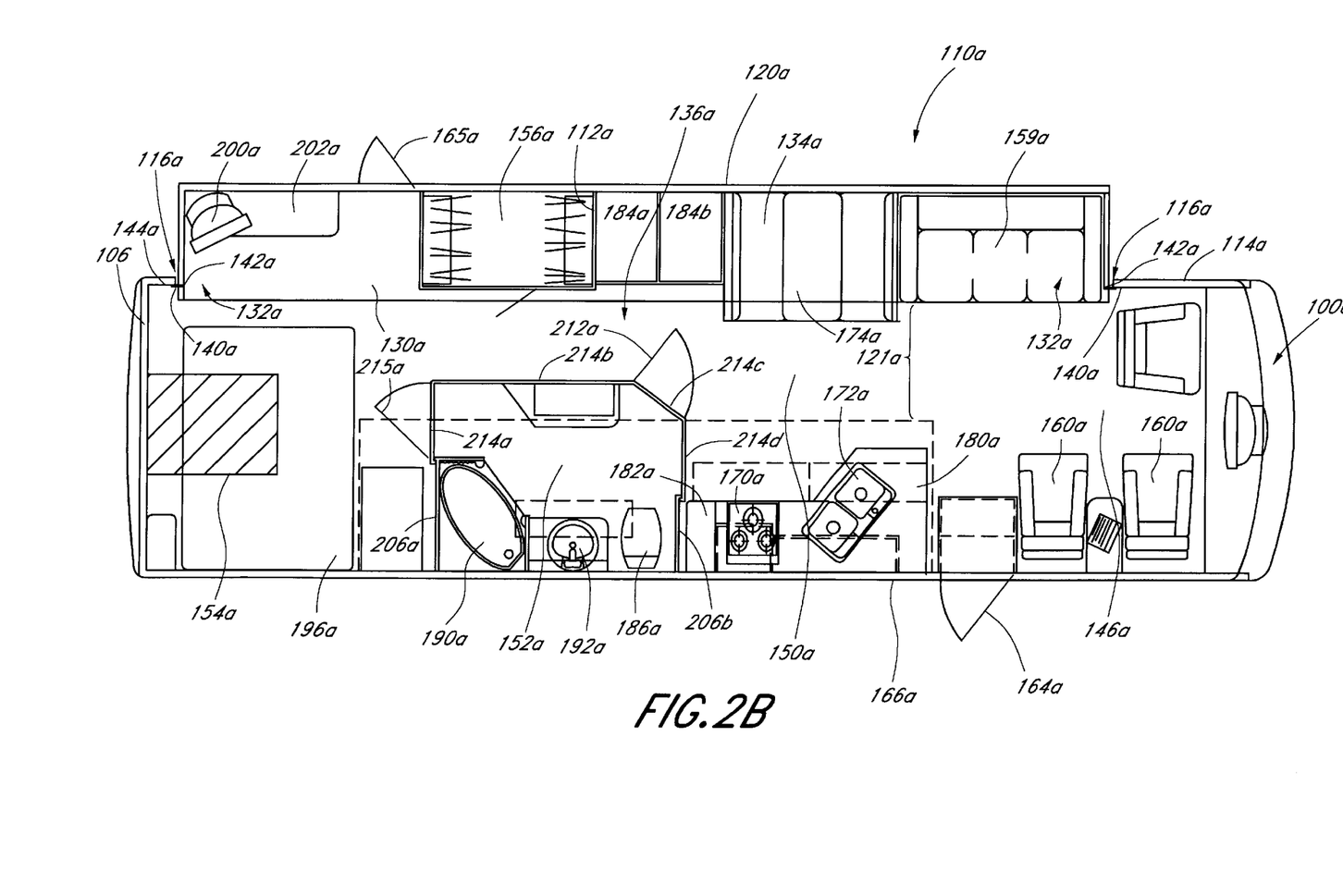
FIG. 2B is an overhead plan view of the motor home of FIG. 1A showing the exterior slide-out assembly and the expandable bathroom in a deployed configuration.

Reference will now be made to FIGS. 2A and 2B which provide a detailed plan view of the living space 110a within the motor home 100a of FIG. 1A. In particular, FIG. 2A illustrates the motor home 100a with the exterior slide-out assembly 112a in the retracted configuration and FIG. 2B illustrates the motor home 100a with the exterior slide-out assembly 112a in the deployed configuration. It will be appreciated that the layout of the living space illustrated herein is simply illustrative of one of a number of possible layouts and that a number of variations to this layout can be made without departing from the spirit of the present invention.

As shown in FIG. 2A, the exterior slide-out assembly 112a, in the retracted configuration, extends into the main housing 106a so that the slide-out assembly 112a is substantially positioned within the living space 110a of the motor home 100a. Consequently, the outer vertical wall 120a of the exterior slide-out assembly 112a is aligned with the opening 116a of the main housing 106a so as to form the motor home 100a with a more aerodynamic shape and so as to reduce the effective width of the motor home 100a while the vehicle is being driven.

As shown in FIG. 2B, the exterior slide-out assembly 112a, in the deployed configuration, extends out of the opening 116a of the first side wall 114a of the main housing 106a so that an opening 132a of the slide-out assembly 112a aligns with the opening 116a of the main housing 106a. Thus, the supplemental living space 134a provided by the deployed exterior slide-out assembly 112a combines with the living space 110a of the main housing 106a to form an expanded living space 136a of the motor home 100a. Although the illustrated embodiment shows the exterior slide-out assembly 112a spanning the entire length of the main housing 106a, it can be appreciated that the slide-out assembly 112a can be a variety of other suitable lengths, depending on the particular application.

Furthermore, the living space 110a of the motor home 100a as shown in FIGS. 2A and 2B generally includes a living room area 146a, a kitchen area 150a, a bathroom area 152a, a bedroom area 154a, and closet space 156a. In particular, the living room area 146a is located adjacent a front entry door 164a that is positioned within a second side wall 166a of the main housing 106a towards the front of the motor home. Preferably, as illustrated in FIGS. 2A and 2B, the living room area 146a includes a couch 159a and a plurality of chairs 160a wherein the couch 159a is placed against the outer vertical wall 120a of the slide-out assembly 112a and the chairs 160a are positioned against the second side wall 166a of the main housing 106a so that the couch 159a and the chairs 160a generally face each other. In this embodiment, the living room area 146a is located adjacent the front of the motor home such that the two front chairs are positioned adjacent the front of the motor home 100a. As is well known in the art, the living area 146a also serves as a riding area for the driver and passengers when the motor home is travelling on the road.

As is further shown in FIGS. 2A and 2B, adjacent the living room area is the kitchen area 150a which includes a kitchen counter 180a, a stove 170a, a food pantry 182a, a refrigerator 184a, a kitchen sink 172a, and a set of dining furniture 174a. In this embodiment, most of the above described kitchen appliances are generally positioned adjacent the second side wall 166a of the main housing 106a while the dining furniture 174a and the refrigerator 184a are positioned across from the kitchen appliances and adjacent the outer vertical wall 120a of the slide-out assembly 112a. Furthermore, next to the kitchen area 150a is the bathroom area 152a which is enclosed in a manner to be described in greater detail below. In this embodiment, the bathroom area 152a comprises a bathtub 190a, a bathroom sink 192a, and a toilet 186a wherein the fixtures are positioned against the second side wall 166a of the main housing 106a.

As is also shown in FIGS. 2A and 2B, adjacent the bathroom area 152a is the bedroom area 154a that comprises a bed 196a, a television set 200a, and a desk 202a. Furthermore, a rear entry door 165a is formed within the outer vertical wall 120a of the exterior slide-out assembly 112a and is positioned generally between the bathroom area 152a and the bedroom area 154a so that individuals can have quicker access to the bathroom 152a by entering the motor home 100a from the rear of the vehicle.

Moreover, as illustrated in FIGS. 2A and 2B, the furniture, fixtures and appliances described above are typically positioned against either the outer vertical wall 120a of the exterior slide-out assembly 112a or the second side wall 166a of the main housing 106a so that a sufficiently wide walkway 204a can be created between the various furniture and fixtures occupying the living space 110a. Preferably, the walkway 204a extends generally along the longitudinal axis of the main housing 106a and can be widened when the exterior slide-out assembly 112a is in a deployed configuration as shown in FIG. 2B. In particular, a wider walkway 121a is created when the exterior slide-out assembly 112a extends its lower horizontal wall 130a out from the opening 116a in the first side wall 114a of the main housing 106a so that the furniture and fixtures placed against the outer vertical wall 120a and resting on the lower horizontal wall 130a of the slide-out assembly 112a will be moved outwardly away from the walkway 204a so as to widen the walkway 204a. Advantageously, in this embodiment, the deployment of the exterior slide-out assembly 112a will not displace the bathroom fixtures, kitchen appliances, and the related plumbing assembly as the fixtures and appliances requiring plumbing are preferably placed against the second side wall 166a of the main housing 106a so as to be unaffected by the deployment of the slide-out assembly 112a.

Furthermore, the bathroom area 152a in this embodiment can also be expanded without having to displace any of the bathroom fixtures and related plumbing assemblies. As generally shown in FIGS. 2A and 2B, the bathroom area 152a is enclosed and defined by a plurality of fixed walls 206a, 206b and movable walls 214a, 214b, 214c, 214d that are mounted within the living space 110a. As will be described in greater detail below, the movable walls 214a, 214b, 214c, 214d are attached to the fixed walls 206a, 206b and slidably mounted so as to be movable with respect to the fixed walls 206a, 206b. Furthermore, the movable walls 214a, 214b, 214c, 214d are movable between a retracted configuration as shown in FIG. 2A and a deployed configuration as shown in FIG. 2B. Consequently, the bathroom area 152a can be expanded further into the main housing 106a by sliding the movable walls 214a, 214b, 214c, 214d of the bathroom 152a into the walkway 204a as shown in FIG. 2B in a manner to be describe in greater detail below.

In this embodiment the movable walls 214a, 214b, 214c, 214d are deployed in conjunction with the exterior slide-out assembly 112a so that the movable walls 214a, 214b, 214c, 214d can extend into a space within the main housing 106a created by the deployed exterior slide-out assembly 112a. Consequently, as shown in FIG. 2B, the expanded bathroom area 152a comprises a larger space that allows an individual to access the bathtub and sink in a convenient manner while the walkway 204a adjacent the bathroom 152a is still wide enough to allow individuals access. Additionally, as will be described in greater detail below, a first and second bathroom door 212a, 215a are formed in sections of the movable walls 214a, 214b, 214c, 214d wherein the first door 212a provides access to the bathroom 152a when the bathroom 152a is in either a deployed or retracted configuration while the second door 215a provides access to the bathroom 152a when the bathroom 152a is in a deployed configuration.

FIGS. 2A and 2B also show a preferred layout of the bathroom fixtures wherein the bathtub 190a, the sink 192a, and the toilet 186a are positioned against the second side wall 166a of the main housing 106a away from the movable walls 214a, 214b, 214c, 214d so that deployment of the movable walls will not displace the bathroom fixtures. In particular, this preferred layout, coupled with the unique manner in which the bathroom area 152a is expanded, obviates the need of having to accommodate the displacement of bathroom fixtures that would otherwise occur when bathrooms are expanded in the traditional manner known in the art. While the preferred embodiments illustrate the movable walls as defining a bathroom area, it can be appreciated that the movable walls can also define other living area such as bedrooms, kitchens, living rooms, closets and the like without departing from the scope of the invention.

Figure 2C:
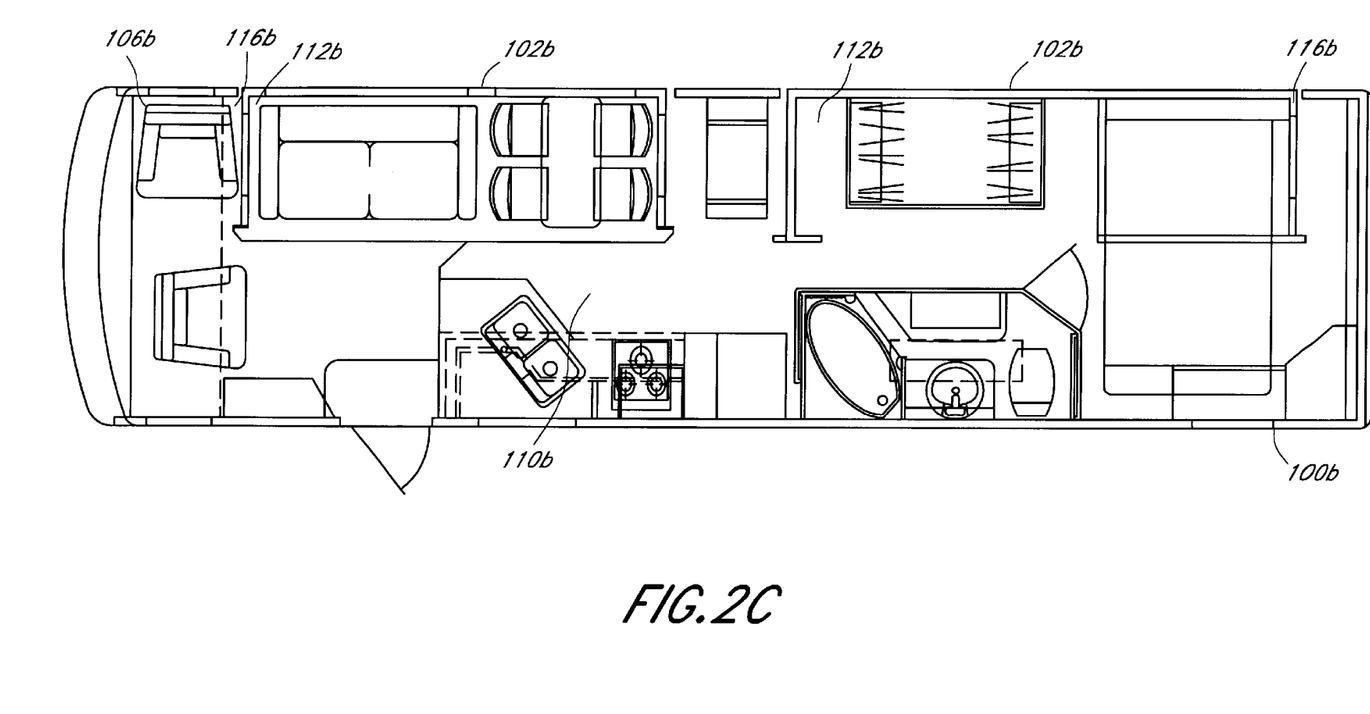
FIG. 2C is an overhead plan view of the trailer of FIG. 1B showing the exterior slide-out assembly and the expandable bathroom in a retracted configuration.
Figure 2D:
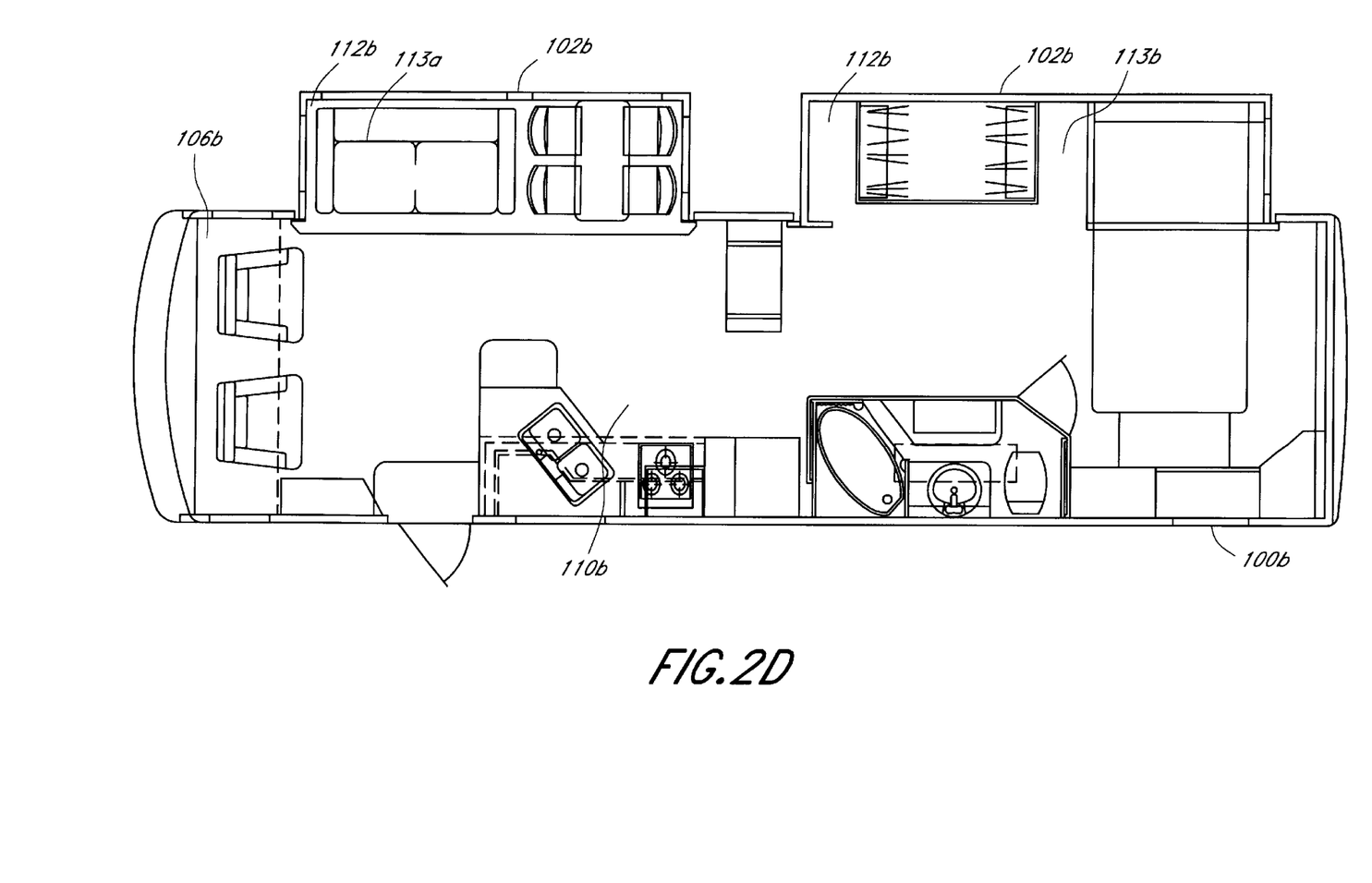
FIG. 2D is an overhead plan view of the trailer of FIG. 1B showing the exterior slide-out assembly and the expandable bathroom in a retracted configuration.

With reference to FIGS. 2C and 2D, a detailed plan of the living space 110b within the trailer 100b of FIG. 1B is provided. In particular, FIG. 2C illustrates the travel trailer 100b with the plurality of exterior slide-out assemblies 112b in the retracted configuration and FIG. 2D illustrates the travel trailer 100b with the exterior slide-out assemblies in the deployed configuration.

As shown in FIG. 2C, the exterior slide-out assemblies 112b, in the retracted configuration, extend into the main housing 106b so that the slide-out assembly 112b is substantially positioned within the living space 110b of the trailer 100b. Consequently, the outer vertical wall 120b of each exterior slide-out assembly 112b is aligned with the opening 116b of the main housing 106b so as to form the trailer 100b with a more aerodynamic shape and so as to reduce the effective width of the trailer 100b while the trailer is being towed.

Furthermore, as shown in FIGS. 2C and 2D, the exterior slide-out assemblies 112b comprise a first slide-out 113b and a second slide-out 115b wherein the first slide-out 113b includes a two level extendable housing as described in Applicant's Pending U.S. application Ser. No. 09/283,708. As FIGS. 2C and 2D illustrate, the general layout of the living space 110b of the travel trailer 100b is similar to the above described layout of the living space 110a for the motor home 100a. Therefore, for the purpose of describing the present invention, the living space layout 110a, 100b of the motor home 100a and the trailer 100b will be assumed to be generally the same except for the orientation of the layout. Specifically, the front section of the motor home layout 110a is the rear section of the travel trailer layout 110b. It will, of course, be appreciated that the exact layout of recreational vehicle floor plans can vary from the illustrated floor plans of FIGS. 2A–2D without departing from the spirit of the present invention.

Figure 3A:
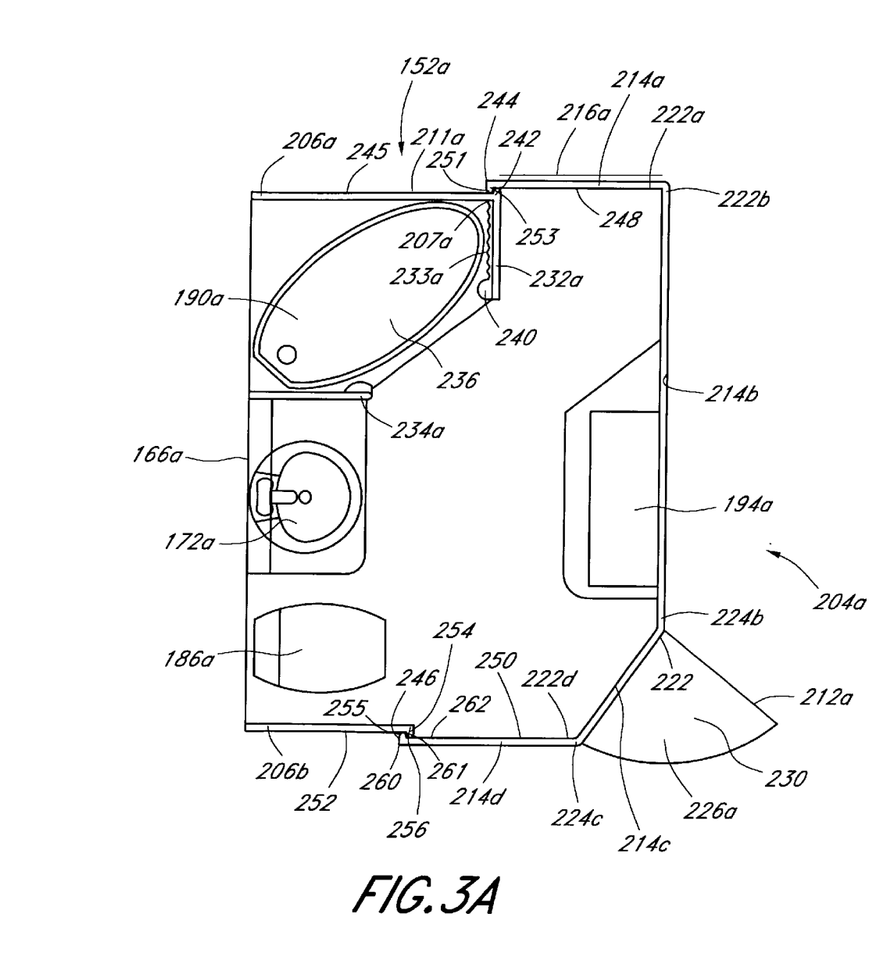
FIG. 3A is an exploded view of the bathroom of FIGS. 2A and 2C in a retracted configuration.
Figure 3B:
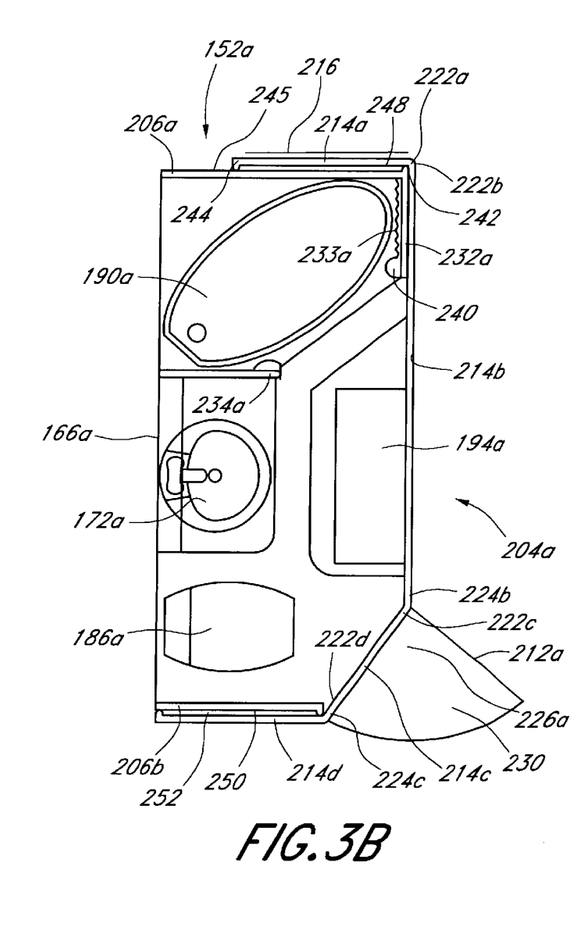
FIG. 3B is an exploded view of the bathroom of FIGS. 2B and 2D in a deployed configuration.

FIGS. 3A and 3B illustrate the bathroom 152a in a retracted configuration and in a deployed configuration respectively. As shown in FIGS. 3A and 3B, the bathroom area 152a is generally rectangularly shaped and enclosed by the plurality of fixed walls 206a, 206b and movable walls 214a, 214b, 214c, 214d as previously described. In particular, the fixed walls 206a, 206b are generally planar and fixedly mounted in an orthogonal manner adjacent to the second side wall 166a of the main housing 106a. The movable walls 214a, 214b, 214c, 214d are also generally planar and are joined together in a known manner so as to form a generally C-shaped movable enclosure that is attached to the fixed walls 206a, 206b in a manner to be described in greater detail below.

Preferably, the first and fourth movable walls 214a, 214d are positioned adjacent and parallel to the fixed walls 206a, 206b and slidably attached in a known manner to the first and second fixed walls 206a, 206b respectively. In particular, an inner surface 248 of the first movable wall 214a is positioned adjacent an outer surface 245 of the first fixed wall 206a while an inner surface 250 of the fourth movable wall 214d is positioned adjacent an outer surface 252 of the second fixed wall 206b. Moreover, a first edge 222a of the first movable wall 214a is joined orthogonally to a first edge 222b of the second movable wall 214b. Furthermore, a second edge 224b of the second movable wall 214b is joined to a first edge 222c of the third movable wall 214c wherein the third wall 214c is positioned at an approximately 45° angle from the plane of the second movable wall 214b. Furthermore, a second edge 224c of the third movable wall 214c is connected at an angle to a first edge 222d of the fourth movable wall 214d so as to complete the formation of a generally C-shaped arrangement. As is shown in FIGS. 3A and 3B, the movable walls 214a, 214b, 214c, 214d are arranged such that the third movable wall 214c is positioned at an angle to the longitudinal axis of the bathroom 152a so as to form a corner 226 of the bathroom 152a that is recessed from the walkway 204a.

The bathroom area 152a can be expanded by manually sliding the movable walls 214a, 214b, 214c, 214d outward from the fixed walls 206a, 206b. In particular, the first and fourth movable walls 214a, 214d can slide along rail tracks positioned on the inner surface 248, 250 of the movable walls 214a, 214d and the outer surface 245, 252 of the fixed walls 206a, 206b in a manner to be described in greater detail below. Alternatively, the movable walls 214a, 214b, 214c, 214d can also be deployed using a powered actuator mechanism in the manner described hereinbelow.

As is also shown in FIGS. 3A and 3B, a first lip 242 is formed along a first edge 211A of the first fixed wall 206a wherein the lip 242 extends orthogonally from the outer surface 245 of the first fixed wall 206a. Moreover, a second lip 244 is formed along a second edge 246 of the first movable wall 214a wherein the second lip 244 extends orthogonally from an inner surface 248 of the first movable wall 214a. Similarly, a first lip 254 is formed on a first edge 256 of the second fixed wall 206b wherein the first lip 254 extends orthogonally from the outer surface 252 of the second fixed wall 206b. A second lip 260 is also formed on a first edge 262 of the fourth movable wall 214d wherein the second lip 260 extends orthogonally from the inner surface 250 of the fourth movable wall 214d. As is illustrated in FIG. 3A, the lips 242, 254 on the fixed walls 206a, 206b form a stop against which the lips 244, 256 on the movable walls 214a, 214d engage when the movable walls 214a–214d are slidably moved into the fully deployed condition shown in FIG. 3A.

As is also shown in FIGS. 3A and 3B, the first bathroom door 212a is formed within the third movable wall 214c so as to provide access to the bathroom 152a when the bathroom 152a is in either a retracted or deployed configuration. In particular, the first bathroom door 212a is designed to swing outwardly from the third movable wall 214c into a space 230 in the walkway 204a that is made available by the recessed bathroom corner 226. Furthermore, as shown in FIGS. 3A and 3B, the second bathroom door 216a is formed in the first movable wall 214a so as to provide additional access to the bathroom 152a when the bathroom 152a is in a deployed configuration as shown in FIG. 3B. In particular, the second door 216a allows individuals to enter the bathroom 152a from the bedroom area 154a so as to provide an optional entry way to the bathroom 152a from the bedroom area 154a.

As shown in FIGS. 3A and 3B, the bathroom 152a of the preferred embodiment includes previously described bathroom fixtures such as the bathtub 190a, the sink 172a, and the toilet 186a as well as a movable storage cabinet 194a In particular, the bathroom fixtures are arranged so as to be positioned against the second side wall 166a of the main housing 106a with the toilet 186a placed adjacent the fourth movable wall 214d, directly across from the first bathroom door 212a.

The positioning of the toilet 186a directly across from the first door 212a permits individuals access to the toilet even when the bathroom 152a is in a retracted configuration as shown in FIG. 3A. It will be appreciated that in many instances it would be desirable to be able to use the bathroom of a recreational vehicle when the recreational vehicle is configured for travelling. By positioning the toilet across from the door, an individual can access the toilet 186a, and, in this embodiment, the sink 172a with the bathroom being in the smaller storage configuration. Hence, even when the recreational vehicle is travelling, access to the essential fixtures of the bathroom is still possible.

Furthermore, as shown in FIGS. 3A and 3B, the movable cabinet 194a is fixedly mounted on the second movable wall 214b wherein the movable cabinet 194a can be used to store towels, toilet paper, and other bathroom supplies. Preferably, the movable cabinet 194a is mounted in such a manner that it does not bind with the floor of the main housing 106a so that it can be readily moved along with the second movable wall 214b.

Moreover, FIGS. 3A and 3B show the bathroom 152a comprising a first and second divider wall 232a, 234a wherein the divider walls 232a, 234a are generally planar and fixedly mounted within the bathroom area 152a so as to enclose the bathtub 190a from the other bathroom fixtures. In particular, the first divider wall 232a is connected in an orthogonal manner to a first edge 207a of the first fixed wall 206a while the second divider wall 234a is mounted orthogonally to the second outer wall 166a of the main housing 106a so as to form a semi-enclosed rectangular area 236 inside the bathroom 152a. Preferably, the bathtub 190a is mounted inside the semi-enclosed area 236 wherein shampoo, soap, towels and the like can be placed on a rack 240 mounted on an inner surface 233a of the first divider wall 232a.

Figure 4A:
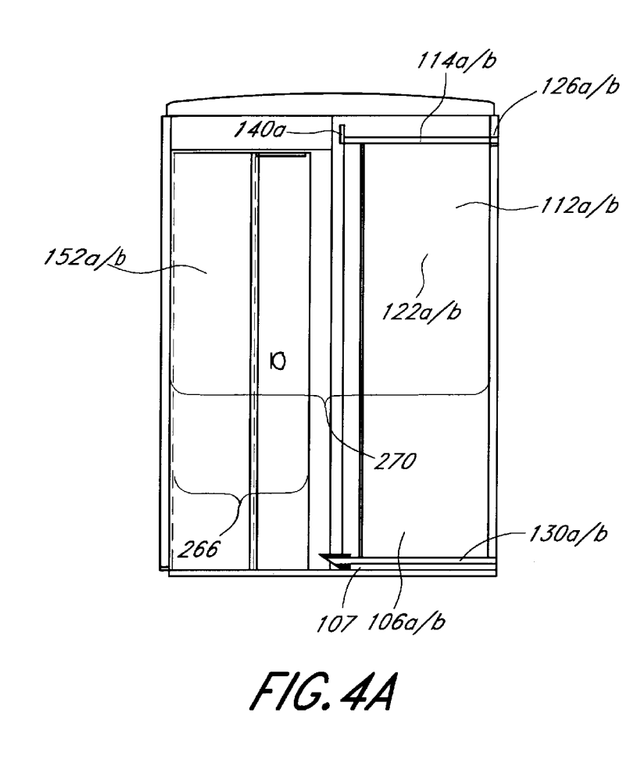
FIG. 4A is an interior perspective view of the travel trailer of FIG. 1 wherein the bathroom wall is in a retracted configuration.
Figure 4B:
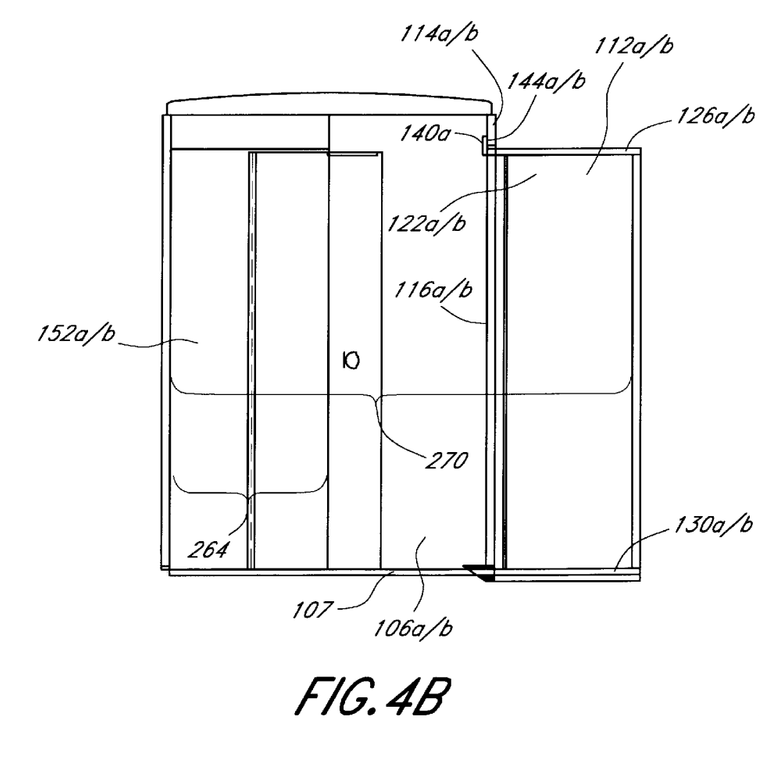
FIG. 4B is an interior perspective view of the travel trailer of FIG. 1 wherein the bathroom wall is in a deployed configurations.

FIGS. 4A and 4B provide a partial cut-away side view of the recreational vehicle 100a, 100b of the preferred embodiment wherein the exterior slide-out assembly 112a, 112b and the expandable bathroom 152a, 152b are in a retracted configuration and deployed configuration, respectively. In the retracted configuration, as is shown in FIG. 4A, the overhead horizontal wall 126a, 126b and the lower horizontal wall 130a, 130b of the exterior slide-out assembly 112a, 112b are positioned inside the main housing 106a, 106b wherein the lower horizontal wall 130a, 130b is positioned adjacent and above a floor 107 of the main housing 106a, 106b. As described previously, the lip 140a extending from the edge 142a, 142b of the walls 122a, 122b, 124a, 124b, 126a, 126b of the exterior slide-out assembly 112a, 112b flushly contacts the inner surface 144a, 144b of the main housing 106a, 106b adjacent the opening 116a, 116b of the first side wall 114a, 114b of the main housing 106a, 106b so as to partially support the exterior slide-out assembly 112a, 112b in the deployed configuration. As is also shown in FIG. 4B, the bathroom 152a, 152b in a deployed configuration has a deployed width 264 that is substantially longer than a retracted width 266 of the bathroom 152a, 152b in the retracted configuration as shown in FIG. 4A. Furthermore, a width 270 of the motor home 100a, 100b is extended by deploying the exterior slide-out assembly 112a, 112b as shown in FIG. 4B.

Figure 5:
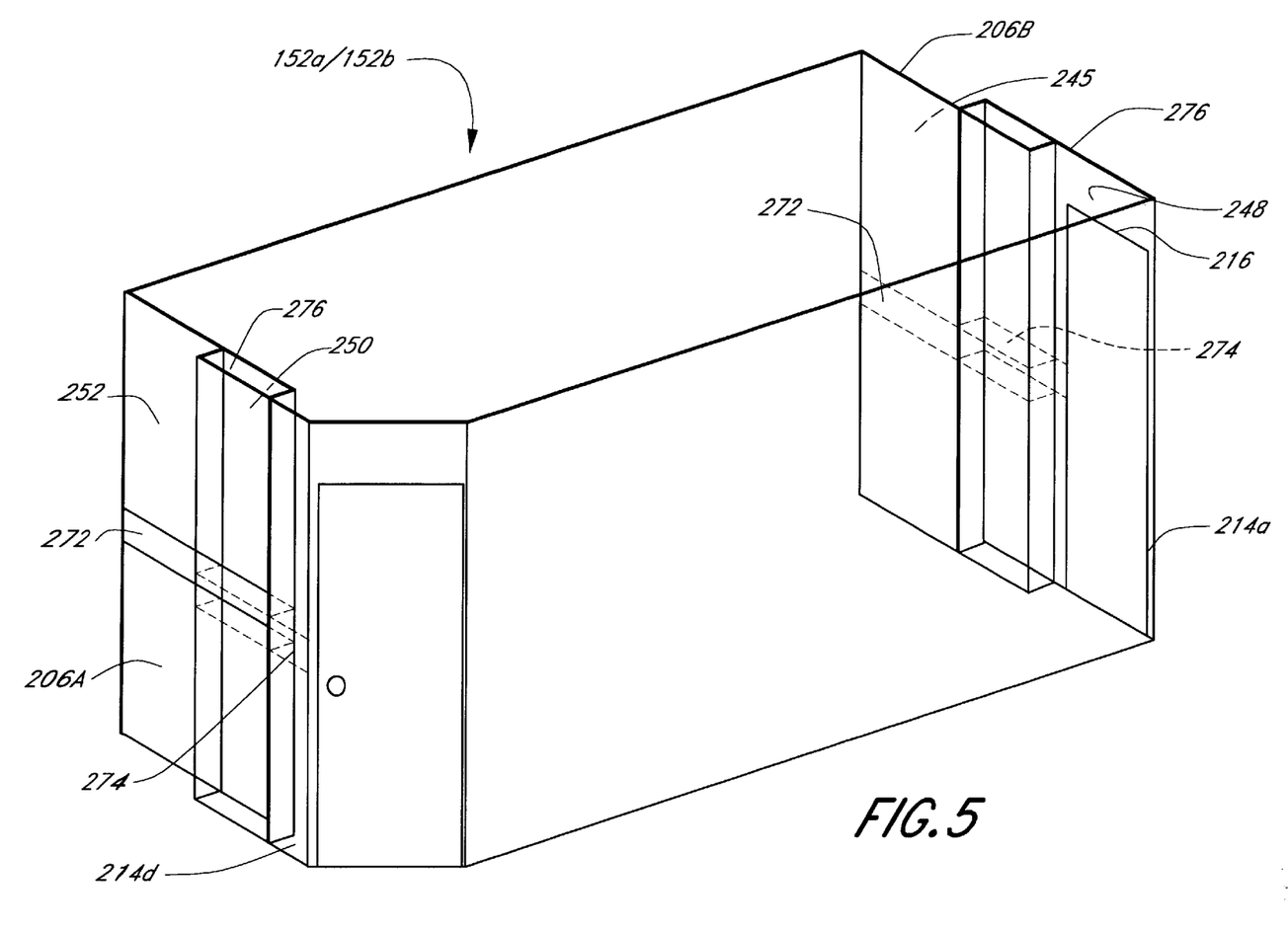
FIG. 5 is a general perspective view of the bathroom of FIG. 1 wherein the movable walls are being deployed.

FIG. 5 illustrates a general perspective view of a preferred embodiment of the expandable bathroom 152a, 152b in a deployed configuration. As is shown in FIG. 5, a first rail track 272 is formed on the outer surface 245, 252 of the fixed walls 206a, 206b and a second rail track 274 is formed on the inner surface 248, 250 of the first and fourth movable walls 214a, 214d respectively. In particular, the first rail track 272 is generally elongated in shape and extends the width of fixed walls 206a, 206b, whereas the second rail track 274, also elongated in shape, extends the width of the first and second movable walls 214a, 214d. Furthermore, the first and second rail tracks 272, 274 are positioned so that the second track 274 slides in the first track 272 in a known manner so as to facilitate the sliding motion of the first and fourth movable walls 214a, 214d while the bathroom 152a is being deployed. It can be appreciated that a similar rail track can also be mounted on the ceiling of the main housing 106a, 106b above an upper edge 276 of the first and fourth movable walls 214a, 214d such that the rail track guides the movement of the movable walls 214a, 214d.

Figure 6A:
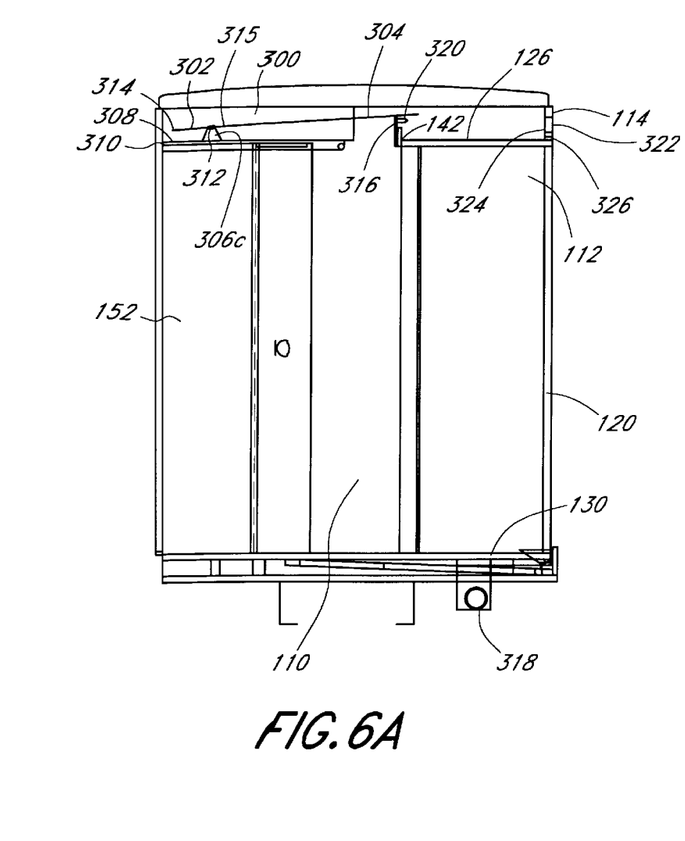
FIG. 6A is a general cross-sectional side view of the recreational vehicle of FIG. 1 wherein the slide-out assembly and the bathroom section are in retracted configurations, showing the movement mechanism used to deploy the bathroom walls in tandem with the slide-out assembly.
Figure 6B:
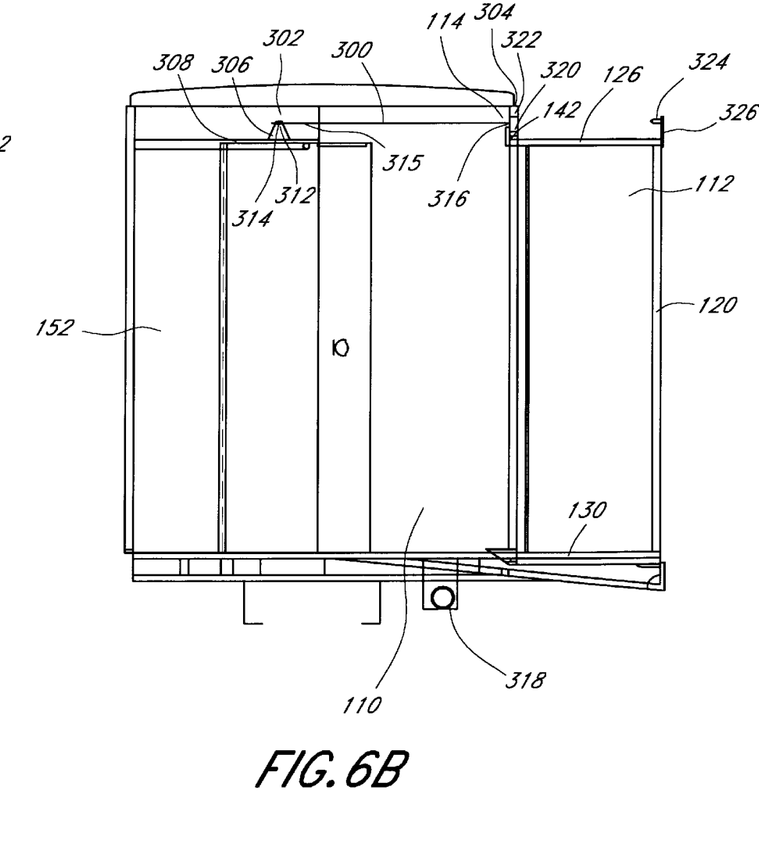
FIG. 6B is a general cross-sectional side view of the recreational vehicle of FIG. 1 wherein the slide-out assembly and the bathroom walls are deployed in tandem using the movement mechanism of FIG. 6A.

In yet another embodiment of the present invention, the expandable bathroom of the recreational vehicle can be deployed and retracted in tandem with the exterior slide-out assembly. FIGS. 6A and 6B illustrate the movement mechanism as generally comprising an adjustable rod 300 that is attached on a first end 302 to the bathroom 152 and on a second end 304 to the slide-out assembly 112. As FIGS. 6A and 6B illustrate, the first end 302 of the adjustable rod 300 is movably attached to a mounting bracket 306 formed on an upper surface 308 of an upper wall 310 of the bathroom 152. In particular, the first end 302 of the adjustable rod 300 is inserted through an opening 312 formed on the mounting bracket 306. Furthermore, the diameter of the opening 312 is preferably sized to permit the rod 300 limited horizontal and vertical movements. Preferably, a first stop 314 and second stop 315 are positioned near the first end 302 of the rod 300 to inhibit the first end 302 of the rod 300 from sliding out from the opening 312 while moving horizontally and to facilitate movement of the walls in a manner to be described in greater detail below.

As is also shown in FIGS. 6A and 6B, the second end 304 of the rod 300 is fixedly mounted to a first flange 316 that extends upwards from the edge 142 of the upper wall 126 of the slide-out assembly 112. Preferably, the rod 300 is mounted in a manner such that outward movements of the slide-out assembly 112 will exert a force on the rod 300 causing the rod 300 to move in a substantially horizontal direction. During deployment of the slide-out assembly, the rod 300 is pulled outwardly by the slide-out assembly 112 causing the first end 302 of the rod to slide in generally the same direction through the opening 312 on the bracket 306 until the first stop 314 of the rod 300 is adjacent the opening 312.

Since the first stop 314 is larger than the opening 312, the rod 300 will stop sliding once it is adjacent the opening 312. As such, a continued pulling of the rod 300 by the slide-out assembly 112 will cause the first stop 314 to push against the bracket 306 in an outward direction. Since the bracket 306 is fixedly mounted to the upper wall 310 of the expandable bathroom, the outward push exerted on the bracket 306 by the first stop 314 of the rod 300 will deploy the movable walls of the bathroom. In one embodiment, the rod 300 is positioned inside a drop ceiling (not shown) so as to be concealed from view.

In the preferred embodiment, a screw driver mechanism 318 is used to mechanically deploy and retract the slide-out assembly 112 in a well known manner. However, it can be appreciated that the exterior slide-out assembly 112 can also be moved manually or by other known methods. Advantageously, the movement mechanism of the preferred embodiment can be used to fully deploy in tandem the slide-out assembly 112 and the expandable bathroom 152 even in cases where the width of the slide-out assembly 112 is greater than the width of the expandable portion of the bathroom 152. As described above in detail, when the slide-out assembly 112 is first deployed, the first end 302 of the adjustable rod 300 is designed to slide outwardly for a predetermined distance without moving the upper wall 310 of the bathroom 152. The ability of the rod 300 to move outwardly for a predetermined distance independent of the upper wall 310 of the bathroom 152 permits the slide-out assembly 112 to extend for a predetermined distance before the expandable portion of the bathroom 152 is actually moved. The delayed deployment of the bathroom 152 compensates for the difference in width between the expandable portion of the bathroom 152 and the slide-out assembly 112.

Thus, when the slide-out assembly 112 is fully deployed as shown in FIG. 6B, the bathroom 152 is also fully expanded. Furthermore, as shown in FIG. 6B, when the slide-out assembly 112 is in a fully deployed configuration, the adjustable rod 300 is in a substantially horizontal position and is secured in position via a first pin 320. The adjustable rod 300 is moved into a substantially horizontal position as the fully extended slide-out assembly 112 is moved downward so as to be level with the floor of the main housing. Preferably, the adjustable rod 300 in a substantially horizontal position is secured in position via a first pin 320. Furthermore, the first pin 320 is preferably formed on the first flange 316 of the slide-out assembly 112 and is fitted into an opening 322 on the first side wall 114 of the main housing of the recreational vehicle when the slide-out assembly is fully deployed. Likewise, a second pin 324 is used to secure the slide-out assembly 112 to the outer vertical wall 120 of the recreational vehicle when the slide-out assembly 112 is in a retracted configuration. In particular, the second pin 324 is formed on a second flange 326 extending from the outer wall 120 of the slide-out assembly 112. When the slide-out assembly 112 is fully retracted, the second pin 324 is fitted into the opening 322 on the first side wall 114 of the main housing. The functional scope and advantages of the first and second pins are described in detail in Applicant's co-pending U.S. Provisional Patent Application No. 60/230,600, entitled "Alignment Mechanism For Recreational Vehicle Slide Outs.

FIG. 6A further shows that as the slide-out assembly 112 is retracted, the adjustable rod 300 first slides inwardly through the opening 312 on the mounting bracket 306 until the second stop 315 of the rod 300 is adjacent the opening 312 on the mounting bracket 306. Preferably, the second stop 315 is larger than the opening so that when the second stop 315 is moved adjacent the opening 312, it will not slide through the opening 312. As the slide-out assembly continues to exert a force on the rod 300, the second stop 315 will push inwardly against the mounting bracket 306 on the upper wall 310 of the bathroom 152 and thereby move the bathroom 152 inwardly as the slide-out assembly 112 continues to retract.

Furthermore, during retraction, the slide-out assembly 112 is moved vertically upwards so that its lower horizontal wall 130 is inside the inner living space 110 of the recreational vehicle. To compensate for the upward movement, the second end 304 of the rod 300 is also moved upwards causing the rod to slant at an angle relative to the upper horizontal wall 310 of the bathroom 152. As described in detail above, the vertical movement of the second end 304 of the rod is made possible because of the manner in which the first end 302 of the rod 300 is movably attached to the mounting bracket 306. In particular, the diameter of the opening 312 on the bracket 306 is dimensioned to allow the first end 302 of the rod 300 some flexibility in moving in the vertical direction. As such, the movement mechanism of the preferred embodiment provides a simple and convenient method of deploying the expandable bathroom in tandem with the slide-out assembly. Advantageously, the mechanism obviates the need of using a separate driver mechanism or manual operation to deploy the bathroom.

It will be appreciated that the expanded bathroom provides the vehicle with a more luxurious atmosphere. In particular, the expanded bathroom of the preferred embodiment provides ample room for individuals to conveniently utilize the bathroom. Furthermore, the manner in which the bathroom is expanded obviates the need of displacing bathroom fixtures or plumbing and therefore allows the use of the more reliable rigid piping for the bathroom plumbing assembly. In contrast, motor homes known in the art, typically comprise relatively small bathroom and dressing areas. Furthermore, motor homes with expandable bathrooms typically are required to use flexible plumbing to accommodate the displacement of the various bathroom fixtures, which increases the likelihood of plumbing leaks and breakage.

It can also be appreciated that the bathroom of the preferred embodiment extends inwardly into the inner housing of the recreational vehicle in a manner that does not require movement of the outer wall that is generally adjacent the bathroom. Furthermore, the bathroom can be extended by manually pushing the inner movable bathroom walls along tracks mounted on the walls so that the bathroom is extended with relative ease. Therefore, the preferred embodiment provides recreational vehicle users with an expandable bathroom without compromising the reliability of the bathroom plumbing assembly. In addition to deploying the bathroom, it can be appreciated that the above described movement mechanism can also be used to expand other inner living sections of the trailer housing without departing from the scope of the present invention.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appended claims.

What is claimed is:

1. A recreational vehicle comprising:
a carriage assembly having a plurality of wheels;
a plurality of outer walls mounted on the carriage assembly wherein the plurality of outer walls define an inner living space having a floor; and
a plurality of inner walls mounted within the inner living space defining an inner section, and wherein the inner walls are movable between a first configuration wherein the floor space of the inner section comprises a first area and a second configuration wherein the floor space of the inner section comprises a second area greater than the first area wherein the inner walls include a first and second wall that are positioned at an angle relative to each other wherein the angle between the first and second walls remains substantially the same in both the first and second configurations.

2. The vehicle of claim 1 wherein the inner section comprises a bathroom.

3. The vehicle of claim 2, further comprising a toilet mounted within the bathroom and a doorway formed in one of the plurality of inner walls wherein the doorway is positioned so as to permit access and use of the toilet when the plurality of inner walls are in both the first configuration and the second configuration.

4. The vehicle of claim 1, wherein the plurality of inner walls comprise a plurality of fixed walls that are attached to each other and are fixedly mounted to the floor of the inner living space and a plurality of movable walls that are attached to each other and are slidably mounted adjacent the floor of the inner living space so that the movable walls can be moved with respect to the plurality of fixed walls between a retracted and a deployed configuration.

5. The vehicle of claim 1, further comprising a slide-out section attached to a first one of the outer walls wherein the slide-out section can be positioned in a storage configuration and a deployed configuration and wherein the slide-out section, in the deployed configuration, increases the area of the inner living space.

6. The vehicle of claim 5, further comprising a movement mechanism coupled with the slide-out section so as to be able to move the slide-out section between the storage configuration and the deployed configuration.

7. The vehicle of claim 6, further comprising a linking mechanism linking the slide-out section and the plurality of movable walls so that movement of the slide-out section between the deployed and retracted configurations results in corresponding movement of the movable walls of the inner section between the first and second configuration.

8. The vehicle of claim 7, wherein the linking mechanism comprises a rod coupled to the slide-out section and to the movable walls.

9. The vehicle of claim 1, wherein the vehicle comprises a motor home.

10. The vehicle of claim 1, wherein the vehicle comprises a travel trailer.

11. The vehicle of claim 1 further comprising a plurality of rail tracks mounted on a surface of the inner walls wherein the inner walls can slide along the rail tracks.

12. The vehicle of claim 11 wherein the sliding movement of the inner walls can be manually activated.

13. A recreational vehicle comprising:
a carriage assembly having a plurality of wheels;
a plurality of outer walls mounted on the carriage assembly wherein the plurality of outer walls define an inner living space having a floor;
a plurality of inner walls joined together so as to be maintained in a substantially fixed orientation to each other and mounted within the inner living space so as to enclose a first floor space wherein the first floor space can be enlarged by moving the inner walls from a retracted configuration into a deployed configuration wherein the inner walls are maintained in substantially the same fixed orientation to each other in both retracted and deployed configurations;
a slide-out section attached to a first one of the outer walls wherein the slide-out section can be positioned in a storage configuration and a deployed configuration and wherein the slide-out section, in the deployed configuration increases the area of the inner living space.

14. The vehicle of claim 13 wherein the first floor space defines a bathroom wherein the bathroom comprises a toilet mounted within the bathroom and a doorway formed in one of the plurality of inner walls wherein the doorway is positioned so as to permit access and use of the toilet when the plurality of inner walls are in both the retracted configuration and the deployed configuration.

15. The vehicle of claim 13 wherein the slide-out section and the inner walls are coupled so that a horizontal movement of the slide-out section results in a substantially simultaneous horizontal movement of the inner walls so that the inner walls can be moved in tandem with the slide-out section.

16. The vehicle of claim 15 further comprising a connecting member having a first end and a second end wherein the first end of the connecting member is attached to one of the inner walls and the second end of the connecting member is attached to the slide-out section wherein the horizontal movement of the slide-out section exerts a first force on the connecting member causing the connecting member to exert a second force on the inner walls wherein the second force is sufficient to move the inner walls horizontally.

17. The vehicle of claim 16 wherein the connecting member comprises a rod structure.

18. The vehicle of claim 16 wherein one of the inner walls comprises an upper horizontal wall.

19. The vehicle of claim 16 wherein the connecting member is movably attached to one of the inner walls in a manner so as to permit the connecting member to move independently of the inner walls for a predetermined distance upon application of the first force before the connecting member begins to exert the second force on the inner walls to move the inner walls.

20. The vehicle of claim 19 wherein the slide-out section in the deployed configuration is wider than the additional first floor space gained when the inner walls are in the deployed configuration.

21. The vehicle of claim 16 wherein the first end of the connecting member is movably attached to one of the inner walls in a manner so as to permit the second end of the connecting member to move vertically for a predetermined distance.

22. The vehicle of claim 16 wherein the horizontal movement of the slide-out section results in deployment of the slide-out section.

23. The vehicle of claim 16 wherein the second force causes deployment of the inner walls.

24. A recreational vehicle comprising:
a carriage assembly having a plurality of wheels;
a plurality of outer walls mounted on the carriage assembly wherein the plurality of outer walls define an inner living space having a floor;
a plurality of fixed walls and a plurality of movable walls mounted within the inner living space, wherein the plurality of fixed and movable walls define an inner section and wherein the plurality of movable walls are movable between a first configuration wherein the floor space of the inner section comprises a first area and a second configuration wherein the floor space of the inner section comprises a second area greater than the first area, wherein the movable walls include a first and second wall that are positioned at an angle relative to each other wherein the angle between the first and second walls remains substantially the same in both the first and second configurations.

25. The vehicle of claim 24 wherein the inner section comprises a bathroom.

26. The vehicle of claim 25, further comprising a toilet mounted within the bathroom and a doorway formed in one of the plurality of movable walls wherein the doorway is positioned so as to permit access and use of the toilet when the plurality of movable walls are in both the first configuration and the second configuration.

27. The vehicle of claim 24, wherein the plurality of movable walls are attached to each other and are slidably mounted adjacent the floor of the inner living space so that the movable walls can be moved with respect to the plurality of fixed walls between a retracted and a deployed configuration.

28. The vehicle of claim 24, further comprising a slide-out section attached to a first one of the outer walls wherein the slide-out section can be positioned in a storage configuration and a deployed configuration and wherein the slide-out section, in the deployed configuration, increases the area of the inner living space.

29. The vehicle of claim 28, further comprising a movement mechanism coupled with the slide-out section so as to be able to move the slide-out section between the storage configuration and the deployed configuration.

30. The vehicle of claim 29, further comprising a linking mechanism linking the slide-out section and the plurality of movable walls so that movement of the slide-out section between the deployed and retracted configurations results in corresponding movement of the movable walls of the inner section between the first and second configuration.

31. The vehicle of claim 30, wherein the linking mechanism comprises a rod coupled to the slide-out section and to the movable walls.

32. The vehicle of claim 30, wherein the vehicle comprises a motor home.

33. The vehicle of claim 30, wherein the vehicle comprises a travel trailer.

* * * * *